US010058821B2

(12) United States Patent
Fehr et al.

(10) Patent No.: US 10,058,821 B2
(45) Date of Patent: Aug. 28, 2018

(54) ION PUMP

(71) Applicant: Infineon Technologies AG, Neubiberg (DE)

(72) Inventors: Bernhard Fehr, Munich (DE); Hanno Melzner, Sauerlach (DE); Karl Heinz Hitzlberger, Erding (DE)

(73) Assignee: Infineon Technologies AG, Neubiberg (DE)

( * ) Notice: Subject to any disclaimer, the term of this patent is extended or adjusted under 35 U.S.C. 154(b) by 192 days.

(21) Appl. No.: 14/025,905

(22) Filed: Sep. 13, 2013

(65) Prior Publication Data

US 2015/0075990 A1    Mar. 19, 2015

(51) Int. Cl.
| *B01D 63/08* | (2006.01) |
| *B01D 61/44* | (2006.01) |
| *B01D 61/42* | (2006.01) |
| *B01D 69/06* | (2006.01) |
| *C25B 13/00* | (2006.01) |
| *H01M 8/10* | (2016.01) |

(52) U.S. Cl.
CPC ......... *B01D 61/445* (2013.01); *B01D 61/422* (2013.01); *B01D 61/425* (2013.01); *B01D 63/08* (2013.01); *B01D 69/06* (2013.01); *C25B 13/00* (2013.01); *B01D 2313/345* (2013.01); *H01M 8/10* (2013.01)

(58) Field of Classification Search
CPC .................. B01D 61/425; G01N 27/44791
See application file for complete search history.

(56) References Cited

U.S. PATENT DOCUMENTS

| 4,743,629 A * | 5/1988 | Karakelle .............. B01D 71/54 |
| | | 521/175 |
| 7,498,570 B2 | 3/2009 | Boyle et al. |
| 2003/0039586 A1* | 2/2003 | Toyoda ................ G01N 27/128 |
| | | 422/98 |
| 2003/0116552 A1* | 6/2003 | Santoruvo ............ B01J 19/0093 |
| | | 219/209 |
| 2004/0129565 A1* | 7/2004 | Prohaska ........... G01N 27/4074 |
| | | 204/424 |
| 2004/0237657 A1* | 12/2004 | Xie ...................... G01N 27/226 |
| | | 73/718 |

(Continued)

FOREIGN PATENT DOCUMENTS

| DE | 112011100919 T5 | 1/2013 |
| WO | 2011115709 A1 | 9/2011 |
| WO | 2012145088 A1 | 10/2012 |

OTHER PUBLICATIONS

Tongwen Xu, Ion exchange membranes: State of their development and perspective, Journal of Membrane Science, Oct. 15, 2005, pp. 1-29, vol. 263, Issues 1-2, DOI: 10.1016/j.memsci.May 2, 2005.

(Continued)

*Primary Examiner* — Ibrahime A Abraham
*Assistant Examiner* — Salil Jain
(74) *Attorney, Agent, or Firm* — Viering, Jentschura & Partner MBB

(57) ABSTRACT

A membrane structure is provided. The membrane structure may include: a membrane; at least one hole extending into the membrane configured to receive a fluid. The membrane may include a plurality of electrodes arranged to provide one or more electric fields to control a movement of the fluid within the at least one hole.

18 Claims, 5 Drawing Sheets

(56) References Cited

U.S. PATENT DOCUMENTS

| | | | | |
|---|---|---|---|---|
| 2007/0132043 | A1* | 6/2007 | Bradley | B82Y 10/00 257/414 |
| 2010/0189600 | A1* | 7/2010 | Hulteen | G01N 21/783 422/401 |
| 2010/0327255 | A1* | 12/2010 | Peng | B82Y 10/00 257/9 |
| 2011/0036973 | A1* | 2/2011 | Alonso | H01J 49/42 250/282 |
| 2014/0083872 | A1* | 3/2014 | Fuerst | A61B 5/14532 205/792 |
| 2014/0174927 | A1* | 6/2014 | Bashir | C12Q 1/6827 204/452 |
| 2015/0219593 | A1* | 8/2015 | Kawai | G01N 27/447 204/549 |
| 2017/0106371 | A1* | 4/2017 | Athanasiou | B01L 7/52 |

OTHER PUBLICATIONS

Sung-Wook Nam, Michael J. Rooks, Ki-Bum Kim, and Stephen M. Rossnagel, Ionic Field Effect Transistors with Sub 10 nm Multiple Nanopores, Nano Letter, 2009, pp. 2044-2048, vol. 9, No. 5, DOI: 10.1021/nl900309s.

PCA GmbH, Anwendungen von Ionenaustauschmembranen (engl.: Applications of ion exchange membranes), URL: http://www.pcagmbh.com/appli/anwend.htm; accessed: Feb. 13, 2014.

Siemens, Meerwasserentsalzung (engl.: Desalination), URL: http://www.siemens.com/innovation/apps/pof_microsite/_pof-spring-2011/_html_de/meerwasserentsalzung.html; accessed: Feb. 13, 2014.

Fraunhofer-Institut fuer Grenzflaechen- und Bioverfahrenstechnik IGB, Elektrodialyse mit bipolaren Membranen zur Gewinnung organischer Saeuren (engl.: Electrodialysis with bipolar membranes for the extraction of organic acids), URL: http://www.igb.fraunhofer.de/de/kompetenzen/umweltbiotechnologie/industrielle-biotechnologie/bipolare-elektrodialyse.html; accessed: Feb. 13, 2014.

Wikipedia, Reverse Osmosis, URL: http://en.wikipedia.org/wiki/Reverse_osmosis; accessed: Feb. 12, 2014.

Wikipedida, Charge-coupled device, URL: http://en.wikipedia.org/wiki/Charge-coupled_device; accessed: Feb. 14, 2014.

Ionic Transport Through Nanopores: From Living Cells to Ionic Diodes and Transistors, Apr. 20, 2007, URL: http://www.ima.umn.edu/2009-2010/W12.7-11.09/activities/Siwy-Zuzanna/Seminar_IMA_Z_Siwy.pdf.

* cited by examiner

FIG. 4

| SEQUENCE | E1 | E2 | E3 | E4 | PROCESS |
|---|---|---|---|---|---|
| 1 | + | - | - | + | Attract negative ions to first electrode from first region |
| 2 | + | + | - | + | Attract them also to large second electrode |
| 3 | - | + | - | - | Catch ions inside pore |
| 4 | - | + | + | - | Push them forward |
| 5 | - | - | + | + | ... and forward |
| 6 | + | - | + | + | ... and forward (and start to attract new ions) |
| 7 | + | - | - | + | (Sequence repeated) |
| 8 | + | + | - | + | Ions are now attracted to fourth electrode |
| 9 | - | + | - | - | Ions are pushed out into second region |

ION PUMP

TECHNICAL FIELD

Various embodiments relate generally to a membrane structure and a method to control a movement of a fluid in the membrane structure.

BACKGROUND

Devices for transferring various fluids through a membrane structure with small pores (e.g. mircopores or nanopores) by means of ion transfer—even against a concentration gradient—by means of an applied electrical field are used currently in conventional technical processes such as: reverse osmose, electrofiltration, ion detection, separation, accumulation, drinking water treatment, desalination, deionization, diminishing the concentration, electrolysis, electrodialysis, in a fuel cell, in a membrane reactor, and the like.

A conventional device for transferring a fluid by means of an ion transfer induced by an applied electric field, which is applied by means of electrodes arranged outside a membrane, typically uses an arrangement which is capable to transfer ions through the membrane, wherein such a membrane is disposed within the electric field to receive from one side of the membrane a fluid flow in one direction depending on the applied electric field direction. The ions can then be transferred through one or more pores of the membrane depending on the electric field strength, wherein one or more chemical or physical processes may be initiated during the passage depending on the kind of membrane used. The sequence of such a process is usually mainly controlled by the permeability of the membrane, the field strength, and the fluid properties.

SUMMARY

A membrane structure to control a movement of a fluid in the membrane structure is provided. The membrane structure may include: a membrane; at least one hole extending into the membrane configured to receive a fluid. The membrane may include a plurality of electrodes arranged to provide one or more electric fields to control a movement of the fluid within the at least one hole.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 4 shows an sequence flowchart according to various embodiments; and

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or a surface may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

A membrane structure in accordance with various embodiments may be configured to allow a fluid to be controlled by means of a plurality of electrodes disposed within (in other words, integrated in) the membrane structure, wherein electrical potentials applied to the plurality of electrodes may generate an electric field which may be an alternating and/or time varying electric field, wherein this applied electric field may be configured to control the movement of the fluid inside the membrane structure, e.g. in the one or more holes, e.g. one or more pores, which are provided in a membrane of the membrane structure. Various embodiments illustratively are based on that charges can be shifted along a surface based on the principle of a "travelling wave" or travelling potential well. Furthermore, the membrane structure may allow the fluid to be transferred inside the membrane structure in two directions by means of an external control. Moreover, the membrane structure may allow to attract anions (negative ions), as well as it may allow to attract cations (positive ions) due to the capability of the plurality of electrodes to generate an alternating electric field inside the membrane structure depending on the electrical potentials applied to the plurality of electrodes. Thus, in various embodiments, the membrane structure may also be referred to as a bidirectional and bipolar membrane structure (e.g. a bidirectional and bipolar ion pump).

Figure 1:
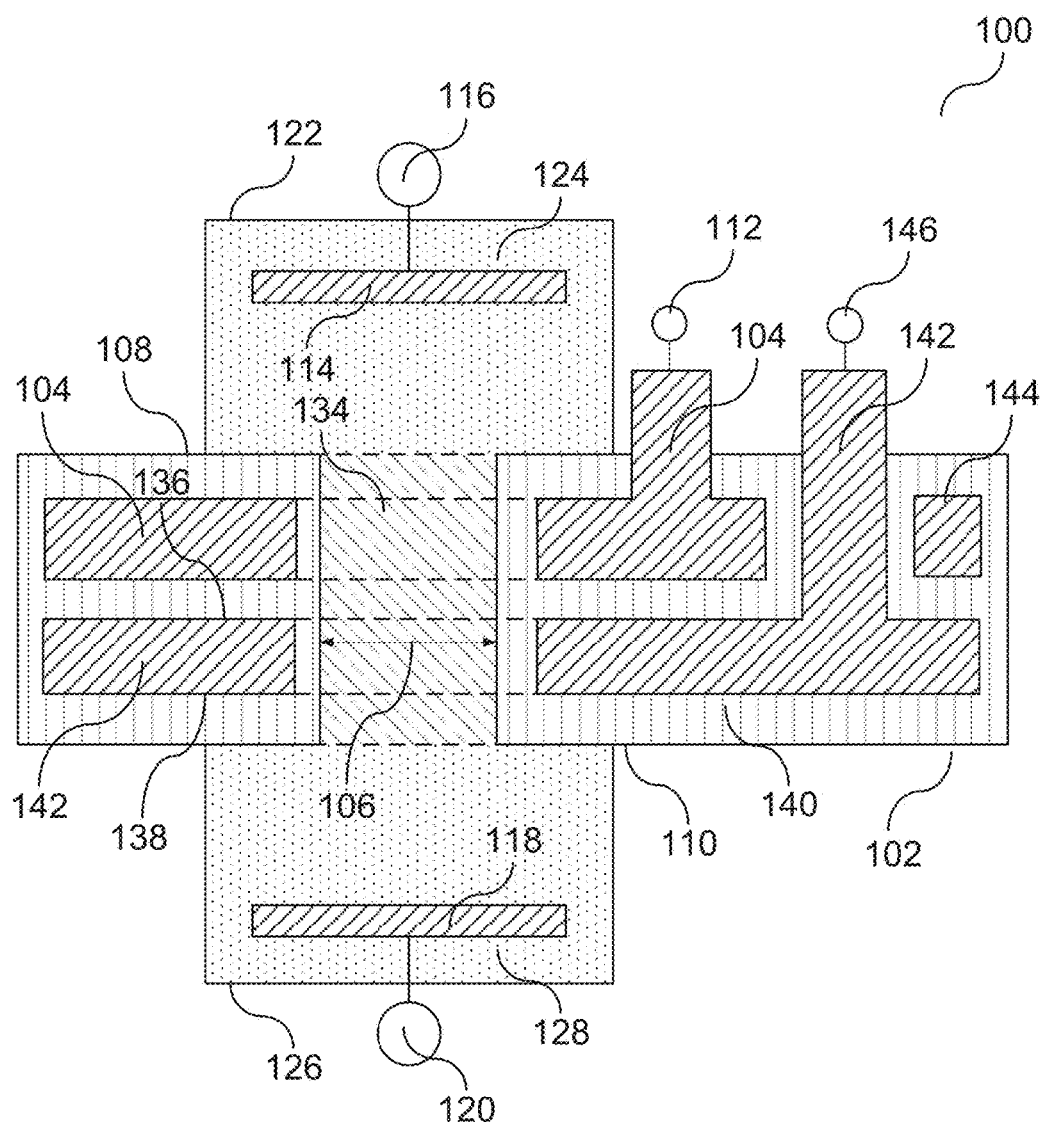
FIG. 1 shows a cross-sectional view of a membrane structure according to various embodiments.

FIG. 1 shows a membrane structure 100 which may include: a membrane 102 and at least one hole 106 (in FIG. 1 exactly one hole 106) which may extend into the membrane 102 and may be configured to receive a fluid 124, 128. The membrane may include a plurality of electrodes 104, 142, 144 arranged to provide one or more electric fields to control a movement of the fluid 124, 128 within the at least one hole 106

The membrane 102 may be a semipermeable membrane, also termed a selectively permeable membrane, a partially permeable membrane or a differentially permeable membrane, wherein such a semipermeable membrane may be configured to allow predetermined molecules or ions to pass through the membrane by means of diffusion and/or occasionally specialized "facilitated diffusion".

The membrane 102 may be formed by at least one of the following materials: organic and/or inorganic polymers, polysulfone, cellulose, polyvinylidene fluoride (PVDF), cellulose acetate, cellulose esters (CA, CN, and CE), regenerated cellulose (RC), nitrocellulose, silicone, silicone polyamide (PA 6), silicone polyamide (PA 6.6), silicone polyamide (PA 6.10), silicone polyamide (PA 6.12), silicone polyamide (PA 11), silicone polyamide (PA 12), silicone carbonate, silicone propylene, silicone sulfone, silicone furon, ceramic, stainless steel, silver, silicon for micro sieve, zeolite (alumosilicate), polysulfone (PS), polyether sulfone (PES), polyacrilonitrile (PAN) polyamide polyimide, polyethylene, polypropylene (PE and PP), polytetrafluoroethylene (PTFE), polyvinylidene fluoride (PVDF), polyvinylchloride (PVC), nylon, poly piperazin amid, polyamide urea, TF—thin film membrane (cellulose acetate supporting layer and a polyamide filter coat), aluminum oxides, silicon dioxide, silicon nitride, silicon carbide, zirconium oxide, polymeric mixes, and mixed glasses.

Such a "facilitated diffusion" may be generated by applying of one or more electric fields with respect to the number of electrodes of the plurality of electrodes 104, 142, 144.

The rate of passage may depend on the pressure, concentration, and temperature of the molecules, ions, or solutes on either side, as well as the permeability of the membrane to each solute. Depending on the membrane 102 and the solute (e.g. a solute within the fluid 124, 128), the permeability may depend on solute size, solubility, properties, or chemistry.

The membrane 102 may be configured to be at least one of types of membranes, wherein the types may be for instance: a cation exchange membrane (CEM), a charge mosaic membrane (CMM), a bipolar membrane (BPM), an anion exchange membrane (AEM), an alkali anion exchange membrane (AAEM), and a proton exchange membrane (PEM).

The membrane 102 may be formed in a so-called dead-end-geometry, wherein in a dead-end filtration the direction of the fluid flow may be normal (in other words in an angle of 90°) to a surface of the membrane 102. The dead-end filtration process may be a batch-type process, where the filtering solution may be loaded (or slowly fed) into membrane 102, which then may allow to passage of some particles subject to the driving force (e.g. an applied electric field). The used (e.g. synthetic) membrane 102 (including e.g. one or more membrane modules) may be a flat (or planar) plate, wherein the plate may be formed as a thin flat membrane 102.

The membrane 102 may be manufactured by means of generating at least one hole or fissure, e.g. micro fissure (or in other words, at least one hole, wherein the terms fissure and hole will be used synonymously herein) into a synthetic material mentioned above. The at least one fissure may be generated by means of various common processes, e.g. printing, lithography, squeegeeing, etching, plasma etching, stamping, embossing, laser cutting, laser vaporation, and the like. The at least one hole 106 may include or be formed by at least one micro hole or at least one nano hole, e.g. by one or more micro pores or by one or more nanpores. The cross-sectional shape of the at least one hole 106 may be at least one of the following geometric shapes: circular, rectangular, ellipsoidal, conical, trapezoidal, hyperbolic, triangular, quadratic, polygonal, any combination of theses geometric shapes, and the like.

The dimensions of the at least one hole 106 may be selected to be suitable for receiving and transporting a fluid to e.g. provide a molecule exchange or an ion exchange. The footprint of the at least one hole 106 may be formed from at least one of the group of the following geometric shapes, wherein the group may include or consist of: a circle, a rectangle, an ellipse, a triangle, a square, a polygonal, any combination of theses geometric shapes, and the like. The footprint of the at least one hole 106 may be e.g. in the range from about 1 $nm^2$ to about 1 $\mu m^2$, e.g. in the range from about 1 $nm^2$ to about 250 $\mu m^2$, e.g. in the range from about 2 $nm^2$ to about 250 $\mu m^2$. In various embodiments, the footprint of the at least one hole 106 may be e.g. less than 2 $nm^2$, The surface of the membrane 102 may include a percentage of the at least one hole 106 in the range from more than 0% pores of the membrane surface to about 50% pores of the membrane surface of the membrane 102.

In various embodiments, the membrane 102 may be formed as a sieve or as a net. In that case, the membrane 102 may include a percentage of the at least one hole 106 in the range from more than 0% pores of the membrane surface to about 90% pores of the membrane surface of the membrane 102.

The membrane 102 may be structured to increase the surface of the membrane 102, wherein an increased membrane surface may allow an increasing flow cross-section of the membrane structure 100, wherein the structure of the membrane 102 may be generated by means of various processes such e.g. printing, heating, annealing, stamping, pressing, embossing, etching, plasma etching, and the like.

The membrane 102 may have a total thickness considered from the first side 108 and the second sides 110 in the range from about 0.1 μm to about 100 μm, e.g. in the range from about 0.1 μm to about 5 μm, e.g. in the range from about 0.5 μm to about 1.5 μm.

The membrane 102 (or the membrane structure 100) may have a lateral expansion in the range from about 0.1 $mm^2$ to about 1 $m^2$, e.g. from about 1 $cm^2$ to about 1 $m^2$, e.g. in the range from about 1 $cm^2$ to about 250 $cm^2$.

The plurality of electrodes 104, 142, 144 may be formed by means of a plurality of conductive layers, wherein the plurality of conductive layers may be electrically conductively coupled to a plurality of terminals 112, 146, wherein each terminal 112, 146 of the plurality of terminals 112, 146 may be conductively coupled to at least one respective electrode 104, 142, 144 of the plurality of electrodes 104, 142, 144, wherein such a configuration may allow supplying an electric potential to the respective electrode of the plurality of electrodes 104, 142, 144. The electric potential applied to a respective terminal 112, 146, may be controlled individually so that various electric fields may be applied by the plurality of electrodes 104, 142, 144, inside the membrane structure 100.

The plurality of terminals 112, 146 may be configured to allow a supply of an respective electrical potential to each electrode 104, 142, 144 of the plurality of electrodes 104, 142, 144, wherein the electrical potential may be supplied such as to allow an individual control of each electric potential so that each electric potential may be varied in duration of an applied electric field, electric field direction, and electric field strength.

Each electrode 104, 142, 144 of the plurality of electrodes 104, 142, 144 may have a first side 136 and a second side 138 and each electrode 104, 142, 144 of the plurality of electrodes 104, 142, 144 may have a thickness which may be the distance between its first side 136 and its second side 138. The thickness of each electrode 104, 142, 144 of the plurality of electrodes 104, 142, 144 may be in the range from about 0.1 μm to about 1 cm, e.g. in the range from about 1 μm to about 1 mm, e.g. in the range from about 1 μm to about 100 μm. The thickness of two individual electrodes 104, 142, 144 of the plurality of electrodes 104, 142, 144 may be different. In other words, two individual electrodes 104, 142, 144 may have a different thickness.

Each electrode 104, 142, 144 of the plurality of electrodes 104, 142, 144 may be formed by means of at least one conductive layer, wherein each conductive layer of the plurality of conductive layers may be formed by at least one conductive material (e.g. one or more conductive materials). The plurality of conductive layers may be formed by at least one of the following conductive materials: copper, gold, silver, iron, platinum, tantalum, titanium, aluminum, copper alloys, gold alloys, silver alloys, iron alloys, platinum alloys, tantalum alloys, titanium alloys, and the like.

Each conductive layer may have at least one hole (e.g. one or more holes or a plurality of holes) formed either in a common process with the at least one hole in the membrane 102 or in an additional process, wherein the one or more holes may correspond to the at least one hole 106 of the membrane 102 with respect to size (e.g. footprint) and position so that the (entirety of the) at least one hole may form at least one hole 106 into the membrane 102, the plurality of electrodes 104, 142, 144, and isolating material 140 described in more detail below.

In various embodiments, the electrodes 104, 142, 144 may be pre-macrostructured before the at least one hole 106 of the membrane 102 may be formed, such as a strip-type, checkered, reticular, and the like. The electrodes 104, 142, 144 may be pre-macrostructured by at least one of the group of structuring methods, wherein the group may include or consist of: printing, heating, annealing, stamping, pressing, embossing, etching, plasma etching, laser ablation, and the like.

By way of example, the electrodes 104, 142, 144 may be pre-macrostructured by means of a stripe-type pattern, wherein 6 exemplary stripes may be formed and the stripes may be formed such that the width of the stripes may be substantially equal to the diameter of the at least one hole 106. The stripes 1, 3, and 5 may be exemplary interconnected with terminal 112 and the stripes 2, 4, 6 may be exemplary interconnected with terminal 146 (i.e. an alternating interconnection). Thus the terminal 112 supplies the stripes 1, 3, and 5 and the terminal 146 supplies the stripes 2, 4, and 6. Therefore, in this case, at least two different hole types may be supplied differently by the two terminals. In case of various electrodes which may be pre-macrostructured, a simultaneously transferring of ions by means of differently supplied hole-types may be provided depending on the pre-macrostructure, the number of interconnected terminals, and on way of the interconnection between terminals and pre-macrostructured electrodes (i.e. how the terminals may be interconnected with the differently pre-macrostructured hole-types).

In other words, the at least one hole 106 may extend through the entire membrane 102, through each electrode 104, 142, 144 of the plurality of electrodes 104, 142, 144 and the isolating material 140.

The footprint of the at least one hole 106 may be e.g. in the range from about 1 nm² to about 1 μm², e.g. in the range from about 1 nm² to about 250 μm², e.g. in the range from about 2 nm² to about 250 μm². In various embodiments, the footprint of the at least one hole 106 may be e.g. less than 2 nm², The at least one hole 106 may either be filled at least partially by at least one porous material 134 described in more detail below or may be substantially free from any material. The at least hole 106 may be configured to allow the fluid, 124 and/or 128, to pass independently from or by means of an applied electric field through the membrane 102, the plurality of electrodes 104, and the isolating material 140.

In case of an individual process to form at least one hole 106 into each electrode 104, 142, 144 of the plurality of the electrodes 104, 142, 144, the at least one hole 106 may be formed into each electrode 104, 142, 144 of the plurality of electrodes 104, 142, 144, wherein the at least one hole 106 may be formed by at least one of the following methods: etching, plasma etching, sputtering, laser ablation, and the like.

Two individual electrodes 104, 142, 144 of the plurality of electrodes 104, 142, 144 may be isolated from each other, wherein the electrodes 104, 142, 144 of the plurality of electrodes 104, 142, 144 may be spatially separated (in other word electrically isolated) from each other by at least one isolating material 140, wherein the at least one isolating material 140 may be formed to have at least one hole to form a portion of the at least one hole 106 of the membrane 102.

The isolating material 140 may have embedded the plurality of electrodes 104, 142, 144. A process to manufacture the plurality of electrodes 104, 142, 144 together with the at least one isolating material 140 may be carried out by means of a stepwise process, wherein the structure of at least one isolating material 140 and the plurality of electrodes 104, 142, 144 may be formed layer by layer so that a stack of them may be formed. Each conductive layer of the plurality of conductive layer of the one or more electrodes 104, 142, 144 may be formed by at least one of the following processes: lithography, anisotropic trench etching, atomic layer deposition (ALD), chemical vapor deposition (CVD), physical vapor deposition (PVD), sputter deposition, evaporation, printing, thermal evaporation, electron beam evaporation, pulsed laser deposition, pulsed laser ablation, arc evaporation, cathodic arc deposition (Arc-PVD), molecular beam epitaxy (MBE), ion beam assisted deposition (IBAD), ion plating, ionized cluster beam deposition (ICBD), plating, electroplating, chemical solution deposition (CSD), chemical bath deposition (CBD), spin coating, spin casting, plasma enhanced CVD (PECVD), metalorganic chemical vapour deposition (MOCVD), electrohydrodynamic deposition (electrospray deposition), chemical beam epitaxy (CBE).

The isolating material 140 may be at least one of the following isolating materials: glass, silicon dioxide, silicon nitride ceramics, porcelain, polymers, composite polymer materials, clay, quartz, alumina, feldspar, fibre reinforced plastic, silicone rubber, ethylene propylene diene monomer rubber (EPDM), and the like.

The layers of the at least one isolating material 140 may be formed in a stepwise layer by layer process by at least one of the following manufacturing processes: sintering, printing, screen printing, squeegeeing, annealing, curing, molding, injection, molding, polymerization, and the like.

The plurality of conductive layers may be embedded within the at least one isolating material 140, and thus the in a first process of manufacturing of a stack of the plurality of conductive layers and the at least one isolating material 140, a layer of the at least one isolating material 140 may be formed. In a subsequent process, a layer of a conductive layer may be formed, and so forth, until a predetermined stack height may be reached. The last layer may be formed by the at least one isolating material 140 in order to isolate each conductive layer of the plurality of conductive layers. In addition, the at least one isolating material 140 may have a spatial expansion which may be larger than the spatial expansion of the plurality of conductive layers so that the at least one isolating material 140 may also isolate the sidewalls of each conductive layer.

The lateral distance between two individual electrodes 104, 142, 144 of the plurality of electrode 104, 142, 144 may be in the range from about 10 µm to about 10 mm, e.g. in the range from about 0.1 mm to about 10 mm, e.g. in the range from about 1 mm to about 10 mm The duration of a sequence between at least a variation of the applied electric potential supply with respect to duration of the applied electric field, electric field direction, and electric field strength may be selected dependent on the species of fluid to be transferred between the electrodes 104, 142, 144 of the plurality of electrodes 104, 142, 144. Typical sequence durations may be in a range from about 1 ms to about 10 s, e.g. in a range from about a 0.1 s to about 10 s, e.g. in the range from about 1 s to about 10 s.

The fluid 124 and/or 128, which may be in physical contact with at least one side 108, 110 of the membrane 102. The fluid 124 and/or 128 may include at least one liquid. The at least one liquid may have the capability to flow and the distinctive property of the liquid state may be surface tension, leading to wetting phenomena.

The fluid, 124 and/or 128, may include at least one gas or at least one liquid, e.g. one or more of the following liquids: water, ethanol, mineral oil, gasoline, organic and/or inorganic solvents, aqueous and/or nonaqueous solvents, liquid ammonia, liquid sulfur dioxide, sulfuryl chloride, sulfuryl chloride fluoride, phosphoryl chloride, dinitrogen tetroxide, antimony trichloride, bromine pentafluoride, hydrogen fluoride, pure sulfuric acid, inorganic acids. solvents, emulsions, suspensions, and the like.

The at least one hole 106 may extend from the first side 108 of the membrane structure 100 to the second side 110 of the membrane structure 100 (and thus may illustratively form at least one through hole 106); wherein the plurality of electrodes 104, 142, 144 may be arranged along the extension of the at least one hole 106 from the first side 108 of the membrane structure 100 to the second side 110 of the membrane structure 100.

The membrane structure 100 may further include a first container 122, which may be coupled to the first side 108 of the of the membrane structure 100, wherein the first container 122 may be configured to receive the fluid 124, and to supply the fluid 124 to the at least one hole 106.

The membrane structure 100 may further include a first electrode 114, which may be arranged in the first container 122. The first electrode 114 disposed inside the first container 122 may be supplied with an electric potential via a first terminal 116 electrically conductively coupled with the first electrode 114.

The membrane structure 100 may further include a second container 126 which may be coupled to the second side 110 of the membrane structure 100, wherein the second container 126 may be configured to receive the fluid 128, and to supply the fluid 128 to the at least one hole 106.

The first container 122 and the second container 126 may be or include one or more vessels which may be formed so that the first and/or second fluid, 124 and/or 126, may be stored within the one or more vessels, respectively. The first container 122 and the second container 126 may be formed to allow communication with at least one further container. In other words, the first container 122 and the second container 126 may be coupled with one or more further vessels or they may be coupled to each other in order that such an arrangement may allow the fluid, 124 or 128, to generate a fluid circuit. In various embodiments, the first container 122 and the second container 126 may be in fluid communication via the at least one hole 106 of the membrane 102.

The first container 122 and the second container 126 may be configured to store different volumina of the first and/or second fluids, 124 and/or 128. The first container 122 and the second container 126 may be open vessels or they may be closed vessels.

The first container 122 and/or the second container 126 may be made of at least one of the following materials: one or more metals, one or more metal alloys, steel, stainless steel, one or more ceramics, one or more plastics, one or more polymers, glass, and the like.

The material(s) for the first container 122 and the second container 126 may be selected with respect to various properties of the fluids 124 and 128, such as the volumina of the fluids, the weight of the fluids, the resulting pressure, and the corrosiveness of the fluids 124 and 128, may be considered.

The membrane structure 100 may be formed so that it may form a permeable barrier device between the first container 122 and the second container 126. In various embodiments, a plurality of membrane structures 100 may be formed so that a stack of membrane structures 100 may form a permeable barrier device between the first container 122 and the second container 126.

The membrane structure 100 may further include a second electrode 118 which may be arranged in the second container 126. The second electrode 118 disposed inside the second container 126 may be supplied with an electric potential via a second terminal 120.

The first electrode 114 and the second electrode 118 may be formed e.g. as leading electrodes for leading the ions in a predetermined direction depending on the electric field direction, wherein the applied electric field generated by the first electrode 114 and the second electrode 118 may be oriented perpendicular to the first side 108 and second side 110 of the membrane structure 100, or as detection electrodes which may be capable to detect ions by means of sensing ions received by the attracting electrode. In other words, with respect to the electric charge on the surface of the respective electrode, the ions may be attracted by that electrode with opposite electric charges on the surface and may be pushed away by that electrode with same electric charges on the surface. The ions may impinge on the surface of the electrode with opposite electric charges, wherein the opposite electric charges of ions and electrode compensate each other and this change in the charges may be detected.

The first electrode 114 and the second electrode 118 may be supplied with an electric potential via the first terminal 116 and the second terminal 120 by a voltage supply, wherein the voltage supply may be configured to allow a variation of the electric potential with respect to applied electric field strength, electric field direction, and duration of the applied electric field.

The at least one hole 106 may include a plurality of holes 106.

The first electrode 114 and the second electrode 118 may be formed by at least one of the following electrically conductive materials: copper, gold, silver, iron, aluminum, copper alloys, gold alloys, silver alloys, iron alloys, and the like.

The first electrode 114 and the second electrode 118 may be formed by a different material as the plurality of electrodes 104, 142, 144.

The first electrode 114 and the second electrode 118 may be formed for example as a plate, wherein the plate may have a footprint of e.g. one of the following geometric shapes: a circle, a rectangle, an ellipse, a trapazoid, a triangle, a square, a polygon, and the like.

The geometric body shape of the first electrode 114 and the second electrode 118 may be selected so that either a homogeneous or an inhomogeneous electric field may be generated. By way of example, the footprint of the first electrode 114 and the second electrode 118 may be selected so that the applied field to the membrane 102 may cover the area on the membrane 102 where the at least one hole 106 may be formed.

The first electrode 114 and the second electrode 118 may have a lateral expansion which may be in the range from about 0.1 mm$^2$ to about 1 m$^2$, e.g. in the range from about 1 cm$^2$ to about 1 m$^2$, e.g. from about 1 cm$^2$ to about 250 cm$^2$.

The at least one hole 106 may include at least one porous material 134, wherein the porous material 134 may include at least one of a micropore, a mesopore, a macropore, and a nanopore. The pores of the porous material 134 and/or the at least one hole 106 may have a diameter which may be e.g. in the range from about 2 nm to about 150 nm, e.g. in the range from about 50 nm to about 150 nm. In various embodiments, the pores of the porous material 134 and/or the at least one hole 106 may have a diameter of less than 2 nm. In various embodiments, the pores of the porous material 134 and/or the at least one hole 106 may have a diameter of more than 50 nm, The porous material 134 may be filled at least partially into the at least one hole 106, wherein the porous material 134 may fill entirely the at least one hole 106 so that the porous material 134 may be in physical contact with the membrane 102 on both sides of the membrane structure 100.

The porous material 134 filled at least partially into the at least one hole 106 may include different pores having one or more diameters according to the above mentioned diameters.

The porous material 134 may be at least one of the following materials: glass, metals, organic and/or inorganic polymers, inorganic oxides, porous gels, aerogels, zeolites, zeotypes, M41S materials, SBA materials, activated carbon, silica mesoporous materials (SMM), and the like.

The at least one hole 106 may include at least one so-called "buried hole", wherein a buried hole may be a region for chemical reactions where a first flow of fluid 124 of the first container 122 and a second flow of fluid 128 of the second container 126 may be combined so that the both fluids may react with each other. Various embodiments may include at least a reactive material inside the "buried hole" so that at least one of the fluids, 124 and/or 128, may react with this at least one reactive material.

By way of example, to produce a sandwich membrane structure 100 (or a layer by layer stack) a support wafer may be used and subsequent lithography and etching may be provided to produce micro- or nanopores into the sandwich structure. In the following process, to produce one or more contact holes to make electrical contact to the "buried layers" the support wafer may be removed by grinding and/or etching and subsequent a thin conformal film inside the one or more holes and on the top surface and the bottom surface of the sandwich structure may be deposited to electrically isolate them.

By means of reciprocating at least one of the fluids, 124 and/or 128, by means of the applied electric field of first electrode 114 and the second electrode 118, within e.g. the pores may induce chemical or physical reactions or processes, e.g. with the porous material 134 or an additional material which may be included within the porous material 134. Moreover, a process with reciprocating at least one of the fluids, 124 or 128, may allow either to accumulate an amount of ions in the fluid, 124 or 128, or to reduce an amount of ions in the fluid, 124 or 128. The reciprocating of ions to initiate similar chemical or physical reactions or processes may also be performed inside the membrane structure 100 by means of applied electric fields of the plurality of electrodes 104, 142, 144.

By means of a combination of applied electric potential at the plurality of electrodes 104, 142, 144 and permeability of the membrane 102 and the porous material 132 to predetermined ion species, the membrane structure 100 may allow to detect the proportion of different ion species according to their respective oxidation state (e.g. copper ions with Cu(I), Cu(II), Cu(III), and the like).

Furthermore, a wide variety of voltage patterns may be applied to the plurality of electrodes 104, 142, 144 in order to selectively move cations (positive ions) and/or anions (negative ions) back and forth, allowing to realize complete complex process sequences in situ (i.e. internal). By way of example, in order to accumulate large ions, large and small ions may be pushed forward through large pores and subsequent small ions may be pushed backwards through the at least one hole, e.g. in the form of one or more small (e.g. micro or nano) pores.

By the way of example, for a desalination process using the membrane structure 100, both types of ions (e.g. Na$^+$ and Cl$^-$) may be pushed through e.g. the one or more pores. This may be accomplished by switching polarities after some period of time, or by using the "travelling wave" concept simultaneously for both types of ions.

Figure 2:
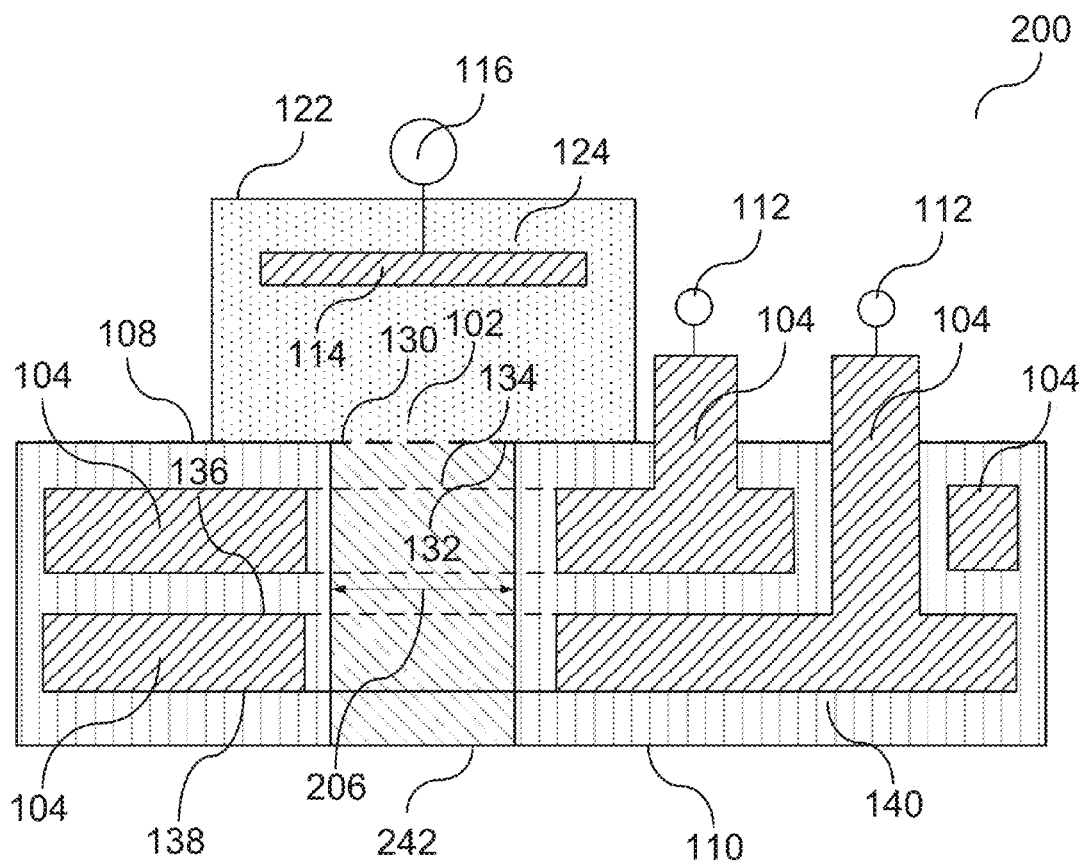
FIG. 2 shows a cross-sectional view of a membrane structure according to various embodiments.

FIG. 2 shows a cross-sectional view of a membrane structure 200 according to various embodiments.

The membrane structure 200 of FIG. 2 is similar to the membrane structure 100 of FIG. 1. Therefore, only the differences between the membrane structure 200 of FIG. 2 and the membrane structure 100 of FIG. 1 will be described in the following. With respect to the other features of the membrane structure 200 of FIG. 2, it is referred to the above description of the membrane structure 100 of FIG. 1.

The at least one hole 206 with the predetermined depth within the membrane 102 may be a blind hole. By way of example, such a blind hole 206 include one or more sensing electrodes, and, optionally, one or more transistors for detection of e.g. material, e.g. molecules (e.g. macromolecules such as biopolymeres) or ions, to be detected, arranged at the bottom 242 of the blind hole 206. The one or more sensing electrodes and the one or more transistors may be integrated into the isolating material 140 or may be arranged on a carrier, e.g. a substrate such as e.g. a printed circuit board. In various embodiments, a detection surface of the one or more sensing electrodes may be exposed to allow a detection of the ions to be detected. In various embodiments, an alternating and time varying electric potential may be applied to the one or more sensing electrodes so that the medium to be detected (e.g. contained in the fluid 124 or 128) may be brought (or "pumped") from the first container 122 to the one or more sensing electrodes, where a detection event is caused, and after the detection event, the medium may be brought (or "pumped") back to the first container 122.

In various embodiments, the detection may be performed further by means of a differential detection. The differential detection may be performed by a reference measurement of a known specific type of ions and/or a known specific amount of ions with respect to ions which may be specified by means of a subsequent measurement. Subsequently, the fluid containing the ions to be specified may be measured. Due to the relation of the results of both measurements, the fluid containing the ions to be specified may be analyzed.

By way of example, the depth of the at least one blind hole 206 may be selected so that the one or more sensing electrodes and, if applicable, the one or more transistors may be disposed into the bottom 242 of the blind hole 206.

The membrane structure 200 may also be configured to accumulate or diminish a concentration of predetermined ions of the fluid 124. Furthermore, the membrane structure 200 may be configured to initiate a chemical or physical reaction, e.g. by means of the optional porous material 134 which may be provided inside the blind hole 206 or an additional substance disposed within the porous material 134 inside the blind hole 206.

By way of example, the membrane 102 may be disposed at one or more sides of the first container 122, e.g. may cover at least partially one or more side walls of the first container 122, wherein the fluid connection with the one or more sensing electrodes may be provided by means of holes through the at least one side wall. In other words, one or more holes may be provided in a wall (or cover) of the first container 122, which is arranged in physical contact with the surface of the membrane 102, wherein the one or more holes are in fluid connection with the at least one hole 106 of the membrane 102.

It is to be noted that in the membrane structure 200 of FIG. 2, the second container of the membrane structure 100 of FIG. 1 is omitted.

Figure 3:
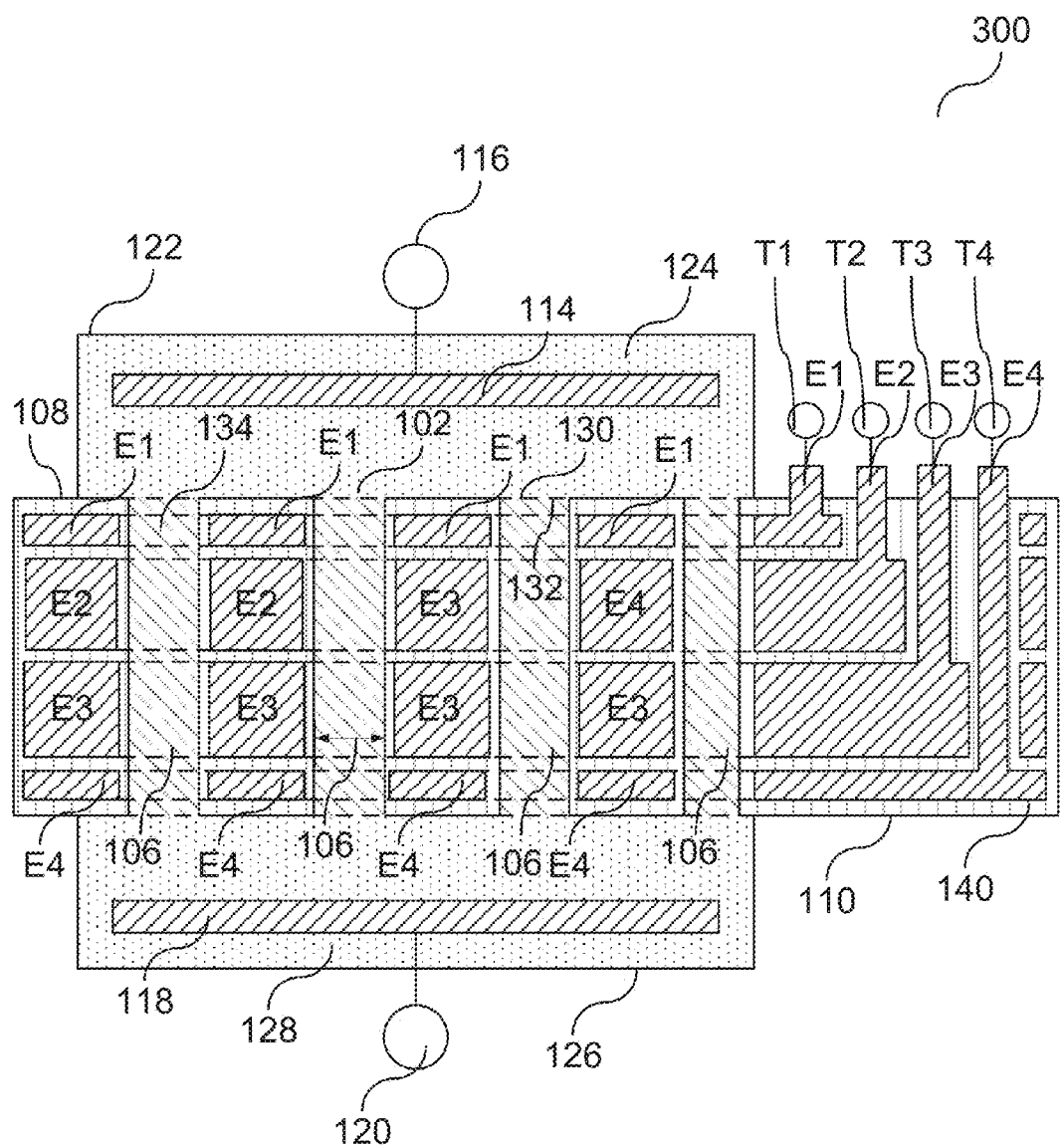
FIG. 3 shows a cross-sectional view of a membrane structure according to various embodiments.

FIG. 3 shows a cross-sectional view of a membrane structure 300 according to various embodiments.

The membrane structure 300 of FIG. 3 is similar to the membrane structure 100 of FIG. 1. Therefore, only the differences between the membrane structure 300 of FIG. 3 and the membrane structure 100 of FIG. 1 will be described in the following. With respect to the other features of the membrane structure 300 of FIG. 3, it is referred to the above description of the membrane structure 100 of FIG. 1.

The membrane structure 300 may include a plurality of (e.g. through) holes 106 extending into the membrane 102 configured to receive a fluid 124, 128. Although in the illustrated embodiments as shown in FIG. 3, only four holes 106 are provided, in various embodiments, any number of holes may be provided in the membrane 300, e.g. 2, 3, 5, 6, 7, 8, 9, 10, more than 10, several tens, 100, more than 100, several hundreds, 1000, more than 1000, several thousands, or even more. Furthermore, in the embodiments, as shown in FIG. 3, four electrodes E1, E2, E3, E4 may be provided, which may be arranged to provide one or more electric fields to control a movement of the fluid 124, 128 within the plurality of holes 106, e.g. from the first container 122 into the second container 126, or vice versa.

Although in FIG. 3 four electrodes E1, E2, E3, E4 are shown, it is to be understood, that in various embodiments, any number of electrodes E1, E2, E3, E4 may be provided in the membrane 300, e.g. 2, 3, 5, 6, 7, 8, 9, 10, or even more.

Each electrode of the plurality of electrodes E1, E2, E3, and E4 is electrically conductively coupled to a respective terminal of a plurality of e.g. four terminals T1, T2, T3, and T4. The terminals T1, T2, T3, and T4 may be supplied with an electric potential in a similar manner as the terminal 112 as already described above. Therefore, each of the terminals T1, T2, T3, and T4 coupled to a corresponding electrode (in this example the following assignments may be made: T1 may be assigned and thus electrically conductively coupled to E1, T2 may be assigned and thus electrically conductively coupled to E2, T3 may be assigned and thus electrically conductively coupled to E3, and T4 may be assigned and thus electrically conductively coupled to E4), wherein each of the four electrodes E1, E2, E3, E4 may be individually controlled. An individual electric potential may be applied to each of the electrodes E1, E2, E3, E4, and thus the flow of the fluid 124, 128 may be controlled inside the holes 106 of the membrane structure 300 by means of the applied electric field generated by the electrodes E1, E2, E3, and E4 with respect to electric field strength, electric field direction, and duration of the applied electric field(s).

By way of example, a first electrode E1 and as fourth electrode E4 of the plurality of electrodes E1, E2, E3, E4 may have the same thickness, wherein these both electrodes E1, E4 may be referred to as "thinner" (or smaller) electrodes E1, E4, and a second electrode E2 and a third electrode E3 of the plurality of electrodes E1, E2, E3, E4 may also have the same thickness which may be larger than the thickness of the first electrode E1 and the fourth electrode E4, wherein the second electrode E2 and the third electrode E3 may be referred to as the "larger" electrodes E2 and E3. However, each individual electrode of the plurality of electrodes E1, E2, E3, E4 may have an individual thickness.

The two outer electrodes, e.g. the first electrode E1 and the fourth electrode E4 may be thin and may play the role of a "gate" that allows ions to enter the respective hole 106 (e.g. the respective pore 106), or confines them inside the respective hole 106 (e.g. the respective pore 106). The two middle electrodes, e.g. the second electrode E2 and the third electrode E3 may be thicker and may illustratively act as "collectors" that may attract larger quantities of ions that are then pushed through the respective hole 106 (e.g. the respective pore 106) by means of a travelling wave.

FIG. 4 shows a sequence flowchart 400 of an operating scheme to operate a membrane structure in accordance with various embodiments, e.g. the membrane structure 300 as shown in FIG. 3.

By way of example, FIG. 4 shows a sequence flowchart 400 of a "pump" process, wherein the pump process may describe the control of a movement of e.g. negative ions inside the holes 106 of the membrane structure 300.

For reasons of simplicity and in order to describe the process in general, the depicted sequence flowchart 400 may describe any kind of negative ions (referred to as anions), wherein such negative ions are independent from a specific strength and duration of an applied electric field. Moreover, the process described by the sequence flowchart 400 also may be carried out with positive ions (referred to as cations), but then the applied electric fields may be controlled to be in the opposite direction. Furthermore, the process described by the sequence flowchart 400 may also be performed for both ion species. In other words, the process described by the sequence flowchart 400 may also be performed to transfer the ions (anions and cations) in the respective opposite direction with respect to the applied electric fields.

The sequence flowchart 400 is organized as follows: a first column 402 includes the number of a respective sequence (in other word a process sequence identifier); a second column 404, a third column 406, a fourth column 408, and a fifth column 410 describe the applied electric potentials of the respective electrode of the four electrodes E1, E2, E3, E4, wherein a "+" ("plus") in a respective cell of a respective coulumn 404, 406, 408, 410 represents an applied positive electric potential and a "−" ("minus") represents an applied negative electric potential at a respective electrode of the four electrodes E1, E2, E3, E4; and a sixth column 412 describes a process carried out in a respective process sequence; and each row represents an individual sequence with its correspondingly applied electric potential of the respective electrode of the four electrodes E1, E2, E3, and E4 and the corresponding process. It should be mentioned that a positive potential may be understood as being more positive than a negative potential. Furthermore, the potentials may be applied such that a constantly increasing or decreasing potential difference between the plurality of electrodes may lead the ions through the at least one hole. In other words, different potentials with respect to strength and orientation may be applied to the plurality of electrodes. In various embodiments, a positive potential may be understood as being more positive than a reference potential provided by a reference electrode, which may be provided in the membrane structure. In various embodiments, a positive potential may be understood as providing a voltage larger than 0 V with respect to the reference potential. In various embodiments, a negative potential may be understood as providing a negative smaller than 0 V with respect to the reference potential. The electrical potentials and the thereby generated voltages are understood to be sufficiently high to move and/or attract the fluid 124, 128 and the ions contained in the fluid 124, 128. Furthermore, the potential difference between the plurality of electrodes E1, E2, E3, E4, if provided, may be considered to be sufficiently high to move the fluid 124, 128 and the ions contained in the fluid 124, 128 in a desired manner from one electrode to another electrode, e.g. a respectively adjacent electrode of the plurality of electrodes E1, E2, E3, E4.

In a first process sequence 414 (identified by a first process sequence identifier "1"), the first electrode E1 and the fourth electrode E4 may have a positive electric potential applied and the second electrode E2 and the third electrode E3 may have a negative electric potential applied. This configuration of applied electric potentials at the electrodes E1, E2, E3, E4 may allow to attract negative ions contained in the fluid 124, 128 to the first electrode E1 from a first region (e.g. the first container 122) into the holes 106.

In a second process sequence 416 (identified by a second process sequence identifier "2"), the first electrode E1, the second electrode E2 and the fourth electrode E4 may have a positive electric potential applied and the third electrode E3 may have a negative electric potential applied. This configuration of applied electric potentials at the electrodes E1, E2, E3, E4 may allow to move the negative ions (and thus the fluid the ions are contained in) further to the second electrode E2.

In a third process sequence 418 (identified by a third process sequence identifier "3"), the second electrode E2 may have a positive electric potential applied and the first electrode E1, the third electrode E3 and the fourth electrode E4 may have a negative electric potential applied. This configuration of applied electric potentials at the electrodes E1, E2, E3, E4 may allow to "catch" the negative ions inside the holes 106 (e.g. the pores 106). In other words, the negative ions may be kept inside the at least one hole 106, e.g. at the position of the second electrode E2.

In the fourth process sequence 420 (identified by a fourth process sequence identifier "4"), the second electrode E2 and the third electrode E3 may have a positive electric potential applied and the first electrode E1 and the fourth electrode E4 may have a negative electric potential applied. This configuration of applied electric potentials at the electrodes E1, E2, E3, E4 may allow to push the negative ions forward to the third electrode E3. As shown in FIG. 4, the region where the ions may be kept by means of the applied electric field may be increased by forming larger electrodes in the "middle" of the membrane structure 400.

In the fifth process sequence 422 (identified by a fifth process sequence identifier "5"), the third electrode E3 may have a positive electric potential applied and the first electrode E1, the second electrode E2, and the fourth electrode E4 may have a negative electric potential applied. This configuration of applied electric potentials at the electrodes E1, E2, E3, E4 may allow to push the negative ions forward to the third electrode E3.

In the sixth process sequence 424 (identified by a sixth process sequence identifier "6"), the first electrode E1, the third electrode E3, the fourth electrode E4 may have a positive electric potential applied and the second electrode E2 may have a negative electric potential applied. This configuration of applied electric potentials at the electrodes E1, E2, E3, E4 may allow to push the negative ions forward to the fourth electrode E4.

In the seventh process sequence 426 (identified by a seventh process sequence identifier "7"), the first electrode E1 and the fourth electrode E4 may have a positive electric potential applied and the second electrode E2 and the third electrode E3 may have a negative electric potential applied, and compared with the first process sequence 414, the electrodes E1, E2, E3, E4 may have the same electric potential. In the seventh process sequence 426 the following sequences may be repeated starting with sequence one until the sixth process sequence 424. This configuration of applied electric potentials at the electrodes E1, E2, E3, E4 may allow to keep the negative ions at the fourth electrode E4 and similar to the first process sequence 414, as already described above, this configuration of applied electric potentials at the electrodes E1, E2, E3, E4 may allow to attract the negative ions to the first electrode E1.

As also shown in the second process sequence 416, in the eighth process sequence 428 (identified by a eighth process sequence identifier "8"), the first electrode E1, the second electrode E2, and the fourth electrode E4 may have a positive electric potential applied and the third electrode E3 may have a negative electric potential applied. This configuration of applied electric potentials at the electrodes E1, E2, E3, E4 may allow to attract negative ions to the second electrode E2, wherein some negative ions may be kept at the fourth electrode E4.

As shown in the third process sequence 418, in the ninth process sequence 430 (identified by a ninth process sequence identifier "9"), the second electrode E2 may have a positive electric potential applied and the first electrode E1, the third electrode E3 and the fourth electrode E4 may have a negative electric potential applied. This configuration of applied electric potentials at the electrodes E1, E2, E3, E4 may allow to "catch" negative ions inside the holes 106 at the second electrode E2 and some negative ions may be pushed out into a second region (e.g. into the second container 126).

In various embodiments, a controller may be provided to generate and supply the respective potentials and to control the above process sequences. It is to be mentioned that in alternative embodiments, other process sequences may also be provided with respect to the operation of the membrane structure.

The following process sequences may be repeated under the control of the controller so that the negative ions may be transferred from the first container 122 to the second container 126 in a controlled manner by means of predetermined applied electric fields between the electrodes E1, E2, E3, E4 with respect to electric field strength, electric field direction, and duration of the applied electric field.

Figure 5:
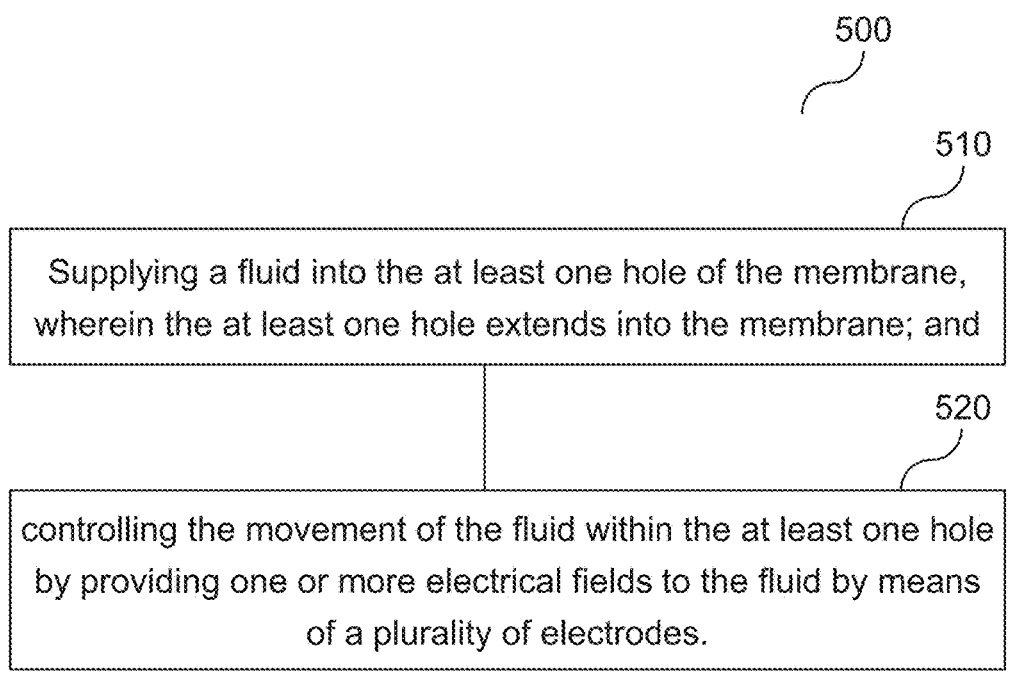
FIG. 5 shows a flow diagram of a method according to various embodiments.

FIG. 5 shows a diagram of a method 500 to control a movement of a fluid within at least one hole in a membrane structure according to various embodiments.

The method 500 may include: supplying a fluid into the at least one hole of the membrane, wherein the at least one hole extends into the membrane (in 510); and controlling the movement of the fluid within the at least one hole by providing one or more electrical fields to the fluid by means of a plurality of electrodes (in 520).

The membrane structure, the membrane, the fluid, the at least one hole of the membrane, and the plurality of electrodes may be the same as already described above within the membrane structures 100, 200, and 300.

The at least one hole may extend through the entire membrane, wherein the controlling the movement of the fluid within the at least one hole may include controlling the movement of the fluid from a first side of the membrane to a second side of the membrane opposite the first side of the membrane.

The fluid may include at least one liquid which may be similar to the liquid described already above within the membrane structure. Controlling the movement of the fluid within the at least one hole may include applying a respective electrical potential to a respective electrode.

In various embodiments, a membrane structure may include a membrane; at least one hole extending into the membrane configured to receive a fluid; and a plurality of electrodes arranged to provide one or more electric fields to control a movement of the fluid within the at least one hole.

In various embodiments, the at least one hole extends through the entire membrane.

In various embodiments, the fluid may include a liquid.

In various embodiments, the membrane structure may further include a plurality of terminals, wherein each terminal may be electrically conductively coupled to a respective electrode of the plurality of electrodes, and wherein each terminal may be configured to receive an electrical potential.

In various embodiments, the membrane may include a first side and a second side opposite the first side, wherein the at least one hole may extend from the first side of the membrane to the second side of the membrane, and wherein the plurality of electrodes may be arranged along the extension of the at least one hole from the first side of the membrane to the second side of the membrane.

In various embodiments, the membrane may include a first side and a second side opposite the first side, wherein the membrane structure may further include a first container which may be coupled to the first side of the membrane and the first container may be configured to receive the fluid and to supply the fluid to the at least one hole.

In various embodiments, the membrane structure may further include a first electrode which may be arranged in the first container.

In various embodiments, the membrane may include a first side and a second side opposite the first side, wherein the membrane structure may further include a second container which may be coupled to the second side of the membrane and wherein the second container may be configured to receive at least one of the fluid via the at least one hole and a further fluid.

In various embodiments, the membrane structure may further include a second electrode arranged in the second container.

In various embodiments, the at least one hole may include a plurality of holes.

In various embodiments, the at least one hole may include at least one of a micropore and a nanopore.

In various embodiments, a method to control a movement of a fluid within at least one hole in a membrane structure may include: supplying a fluid into the at least one hole of the membrane, wherein the at least one hole may extend into the membrane; and controlling the movement of the fluid within the at least one hole by providing one or more electrical fields to the fluid by means of a plurality of electrodes.

In various embodiments, the at least one hole may extend through the entire membrane and wherein the controlling the movement of the fluid within the at least one hole may include controlling the movement of the fluid from a first side of the membrane to a second side of the membrane opposite the first side of the membrane.

In various embodiments, the fluid may include a liquid.

In various embodiments, controlling the movement of the fluid within the at least one hole may include applying a respective electrical potential to a respective electrode.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range from equivalency of the claims are therefore intended to be embraced.

What is claimed is:

1. A membrane structure, comprising:
   a membrane;
   at least one hole extending through the membrane, the at least one hole configured to receive a fluid;
   the membrane comprising an isolating material and a plurality of electrodes arranged sequentially along a longitudinal axis of the at least one hole to provide one or more electric fields to control a movement of the fluid within the at least one hole, wherein the isolating material insulates the plurality of electrodes at least from the at least one hole; and
   a plurality of terminals, each terminal being electrically conductively coupled to a respective electrode of the plurality of electrodes, each terminal configured to receive an individual electrical potential;
   wherein the plurality of electrodes comprises:
      opening electrodes at either opening of the at least one hole and at least one central electrode arranged between the opening electrodes, wherein the at least one central electrode has a thickness greater than a thickness of the opening electrodes.

2. The membrane structure of claim 1, wherein the fluid comprises a liquid.

3. The membrane structure of claim 1, wherein the membrane comprises a first side and a second side opposite the first side;
   wherein the membrane structure further comprises a first container coupled to the first side of the membrane, the first container configured to receive the fluid and to supply the fluid to the at least one hole.

4. The membrane structure of claim 3, further comprising: a first electrode arranged in the first container.

5. The membrane structure of claim 1, wherein the membrane comprises a first side and a second side opposite the first side;
   wherein the membrane structure further comprises a second container coupled to the second side of the membrane, the second container configured to receive at least one of the fluid via the at least one hole and a further fluid.

6. The membrane structure of claim 5, further comprising: a second electrode arranged in the second container.

7. The membrane structure of claim 1,
wherein the at least one hole comprises a plurality of holes.

8. The membrane structure of claim 1,
wherein the at least one hole comprises at least one of a micropore and a nanopore.

9. A membrane structure, comprising:
a membrane having a first side and a second side opposite the first side;
at least one receptacle extending into the membrane from the first side without extending through to the second side, the at least one receptacle configured to receive a fluid; and
the membrane comprising a plurality of electrodes arranged sequentially along a depth of the at least one receptacle to provide one or more electric fields to control a movement of the fluid within the at least one receptacle.

10. The membrane structure of claim 9, further comprising:
one or more sensing electrodes in the at least one receptacle, the sensing electrode configured to detect a selection from the group consisting of one or more materials, one or more molecules, one or more ions, and any combination thereof.

11. The membrane structure of claim 10, further comprising:
one or more transistors in the at least one receptacle, the one or more transistors configured to detect a selection from the group consisting of one or more materials, one or more molecules, one or more ions, and any combination thereof.

12. A membrane structure, comprising:
a membrane;
at least one hole extending through the membrane, the at least one hole configured to receive a fluid;
the membrane comprising an isolating material and a plurality of electrodes arranged sequentially along a longitudinal axis of the at least one hole to provide one or more electric fields to control a movement of the fluid within the at least one hole, wherein the isolating material insulates the plurality of electrodes at least from the at least one hole; and
a plurality of terminals, each terminal being electrically conductively coupled to a respective electrode of the plurality of electrodes, each terminal configured to receive an individual electrical potential;
wherein the at least one hole further comprises a porous material at least partially in the at least one hole.

13. The membrane structure of claim 1,
wherein the at least one hole further comprises a reactive material configured to react with the fluid.

14. The membrane structure of claim 4,
wherein the first electrode is formed from a first material and the plurality of electrodes are formed from a second material, wherein the first material is different from the second material.

15. A membrane structure, comprising:
a membrane;
at least one hole extending through the membrane, the at least one hole configured to receive a fluid and wherein the at least one hole comprises at least one of a micropore and a nanopore; and
the membrane comprising an isolating material and a plurality of electrodes arranged sequentially along a longitudinal axis of the at least one hole to provide one or more electric fields to control a movement of the fluid within the at least one hole, wherein each of the plurality of electrodes is configured to receive an individual electrical potential and wherein the isolating material insulates the plurality of electrodes at least from the at least one hole;
wherein the plurality of electrodes comprises:
opening electrodes at either opening of the at least one hole and at least one central electrode arranged between the opening electrodes, wherein the at least one central electrode has a thickness greater than a thickness of the opening electrodes.

16. The membrane structure of claim 15,
wherein the membrane comprises a first side and a second side opposite the first side;
wherein the membrane structure further comprises a first container coupled to the first side of the membrane, the first container configured to receive the fluid and to supply the fluid to the at least one hole; and
a first electrode arranged in the first container.

17. The membrane structure of claim 16,
wherein the membrane structure further comprises a second container coupled to the second side of the membrane, the second container configured to receive at least one of the fluid via the at least one hole and a further fluid; and
a second electrode arranged in the second container.

18. The membrane structure of claim 12,
wherein within the porous material is a reactive material.

\* \* \* \* \*